ously.

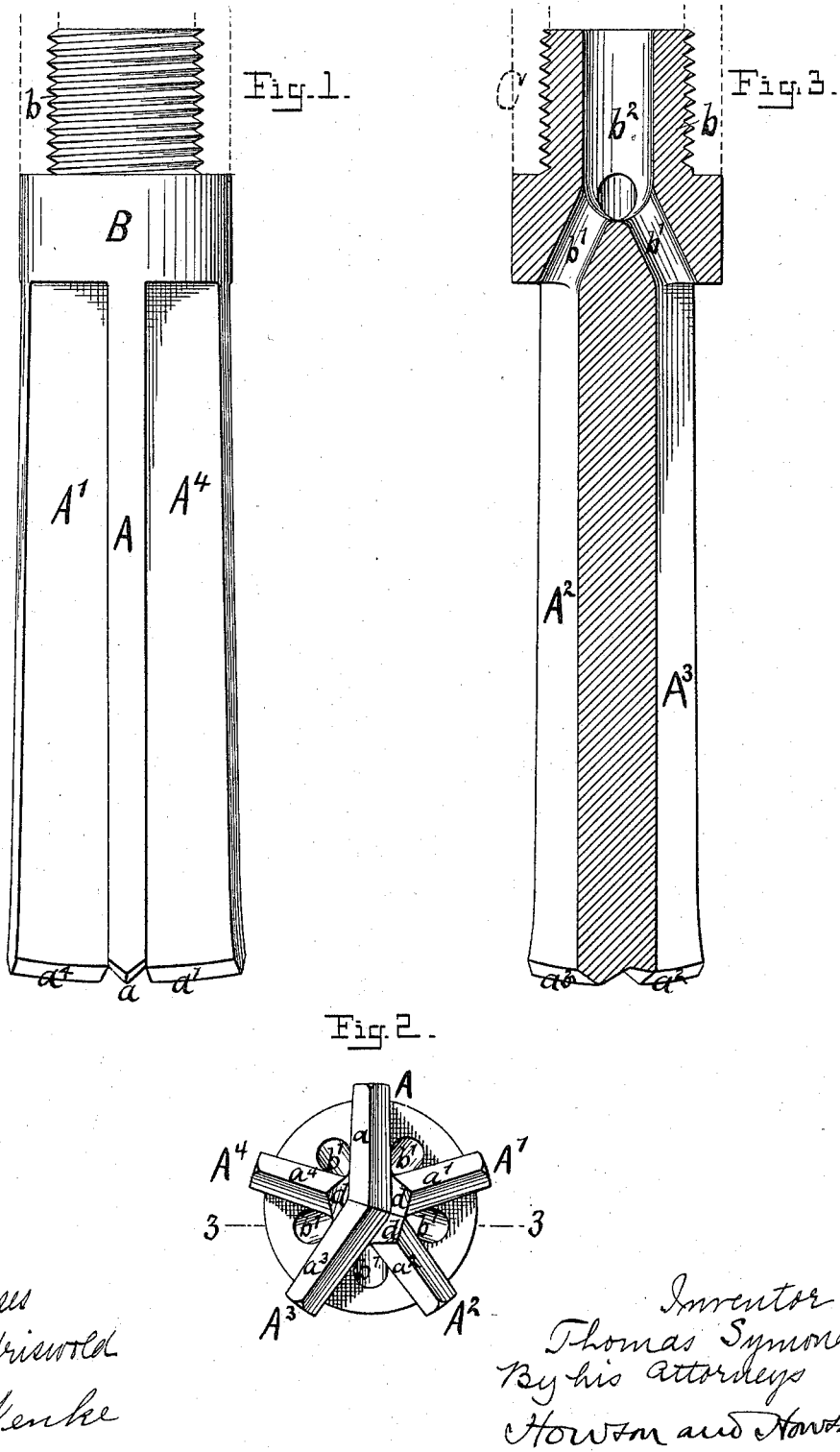

UNITED STATES PATENT OFFICE.

THOMAS SYMONDS, OF LEOMINSTER, MASSACHUSETTS; ARTHUR H. FOLGER ADMINISTRATOR OF SAID SYMONDS, DECEASED.

ROCK-DRILL.

SPECIFICATION forming part of Letters Patent No. 580,352, dated April 6, 1897.

Application filed December 31, 1895. Renewed January 15, 1897. Serial No. 619,388. (No model.)

*To all whom it may concern:*

Be it known that I, THOMAS SYMONDS, a citizen of the United States of America, and a resident of Leominster, Massachusetts, have invented an Improved Rock-Drill, of which the following is a specification.

My invention consists of an improved construction of rock-drill, designed with the view of securing the most effective cutting action and to clear itself of the disintegrated rock, as hereinafter more fully described.

In the accompanying drawings, Figure 1 is a side elevation of my improved drill. Fig. 2 is an end view of the cutting-face of the drill; and Fig. 3 is a sectional view on the line 3 3, Fig. 2.

I construct my drill with five radial lips A, A', $A^2$, $A^3$, and $A^4$, Fig. 2, united together at the center, and to a common head B. This head is threaded at $b$ to screw into a suitable hollow shank C, Fig. 3, which may be provided with a valve or valves for the ready clearance of the detritus, as described, for instance, in my Patent No. 542,542, dated July 9, 1895. In the head B are provided five inclined passages $b'$, forming communication between the several open spaces between the lips A A' $A^2$, &c., and a common passage $b^2$, leading into the interior of the hollow shank, to which the drill-bit is to be secured, Fig. 3.

The five lips A, A', $A^2$, $A^3$, and $A^4$ are severally provided with cutting edges $a$, $a'$, $a^2$, $a^3$, and $a^4$, respectively. Two of these cutting edges, such as $a$ and $a^3$, preferably not adjacent ones, join at the center from which the several lips radiate, while the other three cutting edges $a$, $a^2$, and $a^4$ are made with inclined shoulders $d$ at or near the center of the bit.

The described construction of drill with five lips united together at the center and all radiating therefrom, as shown, gives a most effective cutting action, as the several cutting edges will be continually coming into contact with fresh portions of the rock as the drill is reciprocated and intermittently turned, generally about one-eighth of a revolution at each reciprocation.

I claim as my invention—

A rock-drill having five lips united together at and radiating from the center, each lip having a straight cutting edge, two of said cutting edges being united together at an angle to each other at the center and forming a continuous angular cutting edge across the face of the drill, and the other cutting edges having inclined shoulders at the center, substantially as described.

In testimony whereof I have signed my name to this specification in the presence of two subscribing witnesses.

THOMAS SYMONDS.

Witnesses:
   DAVID A. HINCKS,
   JOSEPH S. QUINN.